(12) United States Patent
Bai

(10) Patent No.: US 10,469,173 B2
(45) Date of Patent: Nov. 5, 2019

(54) HIGH-SPEED LOW-POWER-CONSUMPTION OPTICAL TRANSCEIVER CHIP

(71) Applicant: WINGCOMM CO. LTD., Jiangsu (CN)

(72) Inventor: Yun Bai, Jiangsu (CN)

(73) Assignee: WINGCOMM CO. LTD., Jiangsu (CN)

( * ) Notice: Subject to any disclaimer, the term of this patent is extended or adjusted under 35 U.S.C. 154(b) by 0 days.

(21) Appl. No.: 16/292,776

(22) Filed: Mar. 5, 2019

(65) Prior Publication Data

US 2019/0222318 A1 Jul. 18, 2019

Related U.S. Application Data

(63) Continuation of application No. PCT/CN2016/098132, filed on Sep. 5, 2016.

(51) Int. Cl.
*H04B 10/40* (2013.01)

(52) U.S. Cl.
CPC .................. *H04B 10/40* (2013.01)

(58) Field of Classification Search
CPC ...................................... H04B 10/40
See application file for complete search history.

(56) References Cited

U.S. PATENT DOCUMENTS

2014/0016926 A1\* 1/2014 Soto ................... H04B 10/0775
398/16
2015/0131999 A1 5/2015 Urban et al.

FOREIGN PATENT DOCUMENTS

| CN | 201210677 Y | 3/2009 |
|---|---|---|
| CN | 202889352 U | 4/2013 |
| CN | 204231356 U | 3/2015 |
| CN | 104601244 A | 5/2015 |
| CN | 106253990 A | 12/2016 |
| CN | 206023791 U | 3/2017 |

OTHER PUBLICATIONS

State Intellectual Property Office of the P.R. China (ISR/CN), "International Search Report for PCT/CN2016/098132", China, dated Apr. 28, 2017.

\* cited by examiner

*Primary Examiner* — Casey L Kretzer
(74) *Attorney, Agent, or Firm* — Locke Lord LLP; Tim Tingkang Xia, Esq.

(57) ABSTRACT

A single-channel high-speed low-power-consumption optical transceiver chip is provided, which comprises an optical transmitter module, an optical receiver module, and a common module, wherein the optical transmitter module comprises a data buffer, a first clock and data recovery unit, a first data selector, a laser driver, a power controller, a first clock buffer, a light-emitting diode, and a first photodiode; the optical receiver module comprises a second photodiode, a direct-current bias module, a transimpedance amplifier, a feedback resistor, a second clock and data recovery unit, a second clock buffer, a second data selector, and an output driver; the common module comprises a power supply controller, a direct-current bias, a logic controller, a serial interface, a memory, and a pseudo random data generator and checker; and the common module also provides a communication loop for the optical transmitter module and the optical receiver module.

18 Claims, 2 Drawing Sheets

HIGH-SPEED LOW-POWER-CONSUMPTION OPTICAL TRANSCEIVER CHIP

CROSS-REFERENCE TO RELATED PATENT APPLICATION

This application is a continuation application of International Patent Application No. PCT/CN2016/098132, filed on Sep. 5, 2016. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention is mainly directed to an optical transceiver chip for use in optical communication.

BACKGROUND

In an optical communication network, data is transmitted in the form of optical signals transmitted and received via optical waveguides. More specifically, a bidirectional optical link is used on a communication device for a bidirectional parallel optical transceiver module used in the link. The optical transceiver generates an optical signal representing data that is modulated with respect to the amplitude and/or phase and/or polarization, and then the optical signal is transmitted on an optical fiber coupled to the transceiver. Each transceiver comprises a transmitter side and a receiver side. At the transmitter side, a laser source generates the laser and an optical coupling system receives the laser and optically couples or images the light to one end of the optical fiber. The laser source is typically made from one or more laser diodes that produce light of a particular wavelength or range of wavelengths. The optical coupling system generally comprises one or more reflective elements, one or more refractive elements and/or one or more diffractive elements. At the receiver side, a photodiode detects the optical data signal transmitted on the optical fiber and converts the optical data signal into an electrical signal, which is then amplified and processed by a circuit at the receiver side to recover the data. The combination of an optical transceiver connected to each end of the optical fiber and the optical fiber itself is commonly referred to as a fiber link.

The optical transceiver used in current optical communication field is often made into a separate chip with a discrete laser driver, transimpedance amplifier, and clock data recovery unit, and then the whole optical receiving and transmission function is realized through the coupling transmission of signals between chips. However, with the increasing speed in the optical communication field, especially in optical transceiver chips used in high-speed optical fiber links (e.g., 10 Gb/s and higher), such discrete chip designs are far from meeting the needs, because of the high power consumption, slow communication speed, and poor anti-interference ability.

Therefore, there is a need for an optical transceiver chip that can operate at relatively high data rate with relatively low power consumption to solve problems in the prior art.

SUMMARY

To solve the above problems, the present invention provides a four-channel high-speed low-power-consumption optical transceiver chip, where each channel comprises an optical transmitter module, an optical receiver module, and a common module.

The optical transmitter module comprises a data buffer, a first clock and data recovery unit, a first data selector, a laser driver, a power controller, a first clock buffer, a light-emitting diode, and a first photodiode. The data buffer transmits input data via the first clock and data recovery unit to the first data selector. The first clock buffer is connected to the first clock and data recovery unit and configured for clock output. The input data is selected by the first data selector and then transmitted to the laser driver for data output, and the laser driver coverts the digital signal into a voltage signal. The voltage signal is converted into an optical signal by the light-emitting diode, and the optical signal is received, converted into a voltage signal, and transmitted to the power controller by the first photodiode monitoring an input end. The power controller is connected to the laser driver, and configured to feed back and adjust the voltage signal outputted from the laser driver.

The optical receiver module comprises a second photodiode, a direct-current bias module, a transimpedance amplifier, a feedback resistor, a second clock and data recovery unit, a second clock buffer, a second data selector, and an output driver. The second photodiode converts a received optical signal into an electric signal and is conducted, and the direct-current bias module is configured to power the optical receiver module. The transimpedance amplifier converts a current signal at a receiving end into a voltage signal and transmits the voltage signal to the second clock and data recovery unit. The feedback resistor is connected in parallel with the transimpedance amplifier, and configured to adjust the electric signal in the transimpedance amplifier. The second clock buffer is connected to the second clock and data recovery unit, and configured for clock output. The second data selector inputs the voltage signal into the output driver. The output driver converts the voltage signal into a digital signal and outputs the digital signal.

The common module comprises a power supply controller, a direct-current bias, a logic controller, a serial interface, a memory, and a pseudo random data generator and checker, and the common module also provides a communication loop for the optical transmitter module and the optical receiver module.

The present invention further provides a single-channel high-speed low-power-consumption optical transceiver chip, which comprises an optical transmitter module, an optical receiver module, and a common module.

The optical transmitter module comprises a data buffer, a first clock and data recovery unit, a first data selector, a laser driver, a power controller, a first clock buffer, a light-emitting diode, and a first photodiode. The data buffer transmits input data via the first clock and data recovery unit to the first data selector. The first clock buffer is connected to the first clock and data recovery unit and configured for clock output. The input data is selected by the first data selector and then transmitted to the laser driver for data output, and the laser driver coverts the digital signal into a voltage signal. The voltage signal is converted into an optical signal by the light-emitting diode, and the optical signal is received, converted into a voltage signal, and transmitted to the power controller by the first photodiode monitoring an input end. The power controller is connected to the laser driver, and configured to feed back and adjust the voltage signal outputted from the laser driver. The optical transmitter module is arranged to have one channel.

The optical receiver module comprises a second photodiode, a direct-current bias module, a transimpedance amplifier, a feedback resistor, a second clock and data recovery unit, a second clock buffer, a second data selector, and an output driver. The second photodiode converts a received optical signal into an electric signal and is conducted, and the direct-current bias module is configured to power the optical receiver module. The transimpedance amplifier converts a current signal at a receiving end into a voltage signal and transmits the voltage signal to the second clock and data recovery unit. The feedback resistor is connected in parallel with the transimpedance amplifier, and configured to adjust the electric signal in the transimpedance amplifier. The second clock buffer is connected to the second clock and data recovery unit, and configured for clock output. The second data selector inputs the voltage signal into the output driver. The output driver converts the voltage signal into a digital signal and outputs the digital signal. The optical receiver module is arranged to have a single channel.

The common module comprises a power supply controller, a direct-current bias, a logic controller, a serial interface, a memory, and a pseudo random data generator and checker; and the common module also provides a communication loop for the optical transmitter module and the optical receiver module.

Preferably, the power controller comprises a direct current voltage conversion circuit and a 10-bit clock and data recovery circuit.

Preferably, the laser driver has a base current Ibase ranging from 0 to 80 mA; and a drive/modulation current Imod ranging from 0 to 80 mA.

Preferably, the data buffer has a maximum gain of 30 db and a maximum boost of 20 db.

Preferably, the first clock buffer has an interface of CML structure and 50Ω.

Preferably, the first clock and data recovery unit has a bandwidth ranging from 1 to 200 MHZ.

Preferably, the transimpedance amplifier has a gain ranging from 0 to 100 db.

Preferably, the second photodiode has a maximum input common-mode current of 10 mA.

Preferably, the second clock buffer has a differential output resistance of 100Ω.

Preferably, the output driver has a differential output resistance of 100Ω, and a differential output voltage amplitude ranging from 0-3.3 V.

Preferably, the second clock and data recovery unit has a bandwidth ranging from 1 to 200 MHZ.

It is to be understood that the foregoing general description and the following detailed description are exemplary and illustrative and are not restrictive of the protection scope of the present invention.

BRIEF DESCRIPTION OF THE DRAWINGS

Further objects, functions and advantages of the present invention will be elucidated with reference to the embodiments described hereinafter and the accompanying drawings in which.

DETAILED DESCRIPTION

Figure 1:
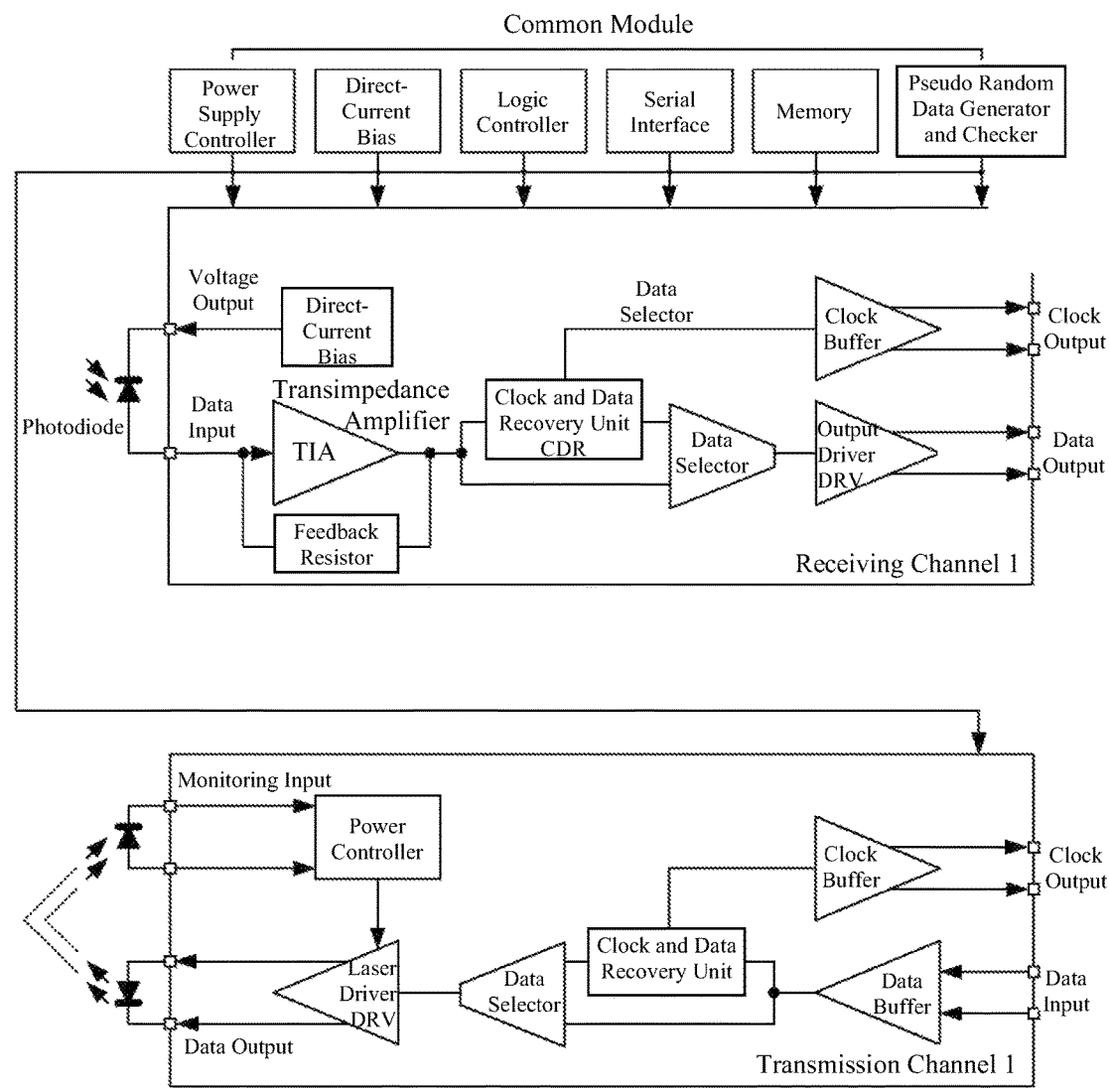
FIG. 1 is a logic diagram schematically showing a single-channel high-speed low-power-consumption optical transceiver chip according to the present invention.

The objects and functions of the present invention and methods for realizing these objects and functions will be elucidated with reference to exemplary embodiments. However, the present invention is not limited to the exemplary embodiments disclosed below; and may be implemented in various forms. The essence of the description is merely to help those skilled in the related art to comprehensively understand the specific details of the present invention.

Hereinafter, embodiments of the present invention will be described with reference to accompanying drawings. In the drawings, the same reference numerals represent the same or similar components.

FIG. 1 shows a logic diagram schematically showing a single-channel high-speed low-power-consumption optical transceiver chip according to the present invention. The optical transceiver chip comprises an optical transmitter module, an optical receiver module, and a common module.

The optical transmitter module comprises a data buffer, a first clock and data recovery unit, a first data selector, a laser driver, a power controller, a first clock buffer, a light-emitting diode, and a first photodiode.

The data buffer transmits input data via the first clock and data recovery unit to the first data selector. According to an embodiment of the present invention, the data buffer has a maximum gain of 30 db and a maximum boost of 20 db.

The first clock buffer is connected to the first clock and data recovery unit and configured for clock output. According to an embodiment of the present invention, the first clock buffer has an interface of CML structure and 50Ω, and the first clock and data recovery unit has a bandwidth ranging from 1 to 200 MHZ.

The input data is selected by the first data selector and then transmitted to the laser driver for data output, and the laser driver coverts the digital signal into a voltage signal. According to an embodiment of the present invention, the laser driver has a base current Ibase ranging from 0-80 mA, and a drive/modulation current Imod ranging from 0 to 80 mA.

The voltage signal is converted into an optical signal by the light-emitting diode, and the optical signal is received, converted into a voltage signal, and transmitted to the power controller by the first photodiode monitoring an input end.

The power controller is connected to the laser driver, and configured to feed back and adjust the voltage signal outputted from the laser driver. According to an embodiment of the present invention, the power controller comprises a direct current voltage conversion circuit and a 10-bit clock and data recovery circuit.

The optical transmitter module is arranged to have a single channel.

The optical receiver module comprises a second photodiode, a direct-current bias module, a transimpedance amplifier, a feedback resistor, a second clock and data recovery unit, a second clock buffer, a second data selector, and an output driver.

The second photodiode converts a received optical signal into an electric signal and is conducted, and the direct-current bias module is configured to power the optical receiver module. According to an embodiment of the present invention, the second photodiode has a maximum input common-mode current of 10 mA.

The transimpedance amplifier converts a current signal at a receiving end into a voltage signal and transmits the voltage signal to the second clock and data recovery unit. According to an embodiment of the present invention, the second clock and data recovery unit has a bandwidth ranging from 1 to 200 MHZ.

The transimpedance amplifier is one of the most common standard modules in a current mode circuit, which is an amplifier converting an input differential voltage into an output current and thus a voltage controlled current source (VCCS). The transimpedance amplifier usually has an extra current input to control the transconductance of the amplifier. The characteristic of a differential input stage of high impedance that can operate in corporation with a negative feedback loop makes the transimpedance amplifier resembling a conventional operational amplifier.

The feedback resistor is connected in parallel with the transimpedance amplifier, and configured to adjust the electric signal in the transimpedance amplifier. According to an embodiment of the present invention, the transimpedance amplifier has a gain ranging from 0 to 100 db.

The second clock buffer is connected to the second clock and data recovery unit, and configured for clock output. According to an embodiment of the present invention, the second clock buffer has a differential output resistance of 100Ω.

The second data selector inputs the voltage signal into the output driver.

The output driver converts the voltage signal into a digital signal and outputs the digital signal. According to an embodiment of the present invention, the output driver has a differential output resistance of 100Ω and a differential output voltage amplitude ranging from 0-3.3 V.

The clock and data recovery unit of the present invention first serially transmits data and then converts the data into an 8 b/10 b encoding scheme. Encoding results in 8-bit data and converts the 8-bit data into a 10-bit symbol. By the 8 b/10 b encoding method, an equal number of 0s and 1s can be transmitted on a data line, thus reducing the intersymbol interference and providing enough data edges, so that the receiver locks the phase on a received data stream. The transmitter multiplies a system clock frequency to a transmission bit rate and sends the 8 b/10 b data on TX differential pairs at this rate.

The task of the clock and data recovery unit is first to lock the phase on a RX differential bit stream, and then the receiver aligns the data bits according to the recovered clock and then aligns the words by using a reference clock of the receiver. Finally, the data is subjected to 8 b/10 b decoding for use by the system.

In a clock and data recovery system, the transmitter and receiver systems usually have completely independent system clocks. The two clocks are critical within a specific range of variations, which is approximately hundreds of PPMs.

The optical receiver module is arranged to have a single channel.

The common module comprises a power supply controller, a direct-current bias, a logic controller, a serial interface, a memory, and a pseudo random data generator and checker. The common module also provides a communication loop for the optical transmitter module and the optical receiver module.

The power supply controller powers the optical transmitter module and the optical receiver module.

The direct-current bias is applied in the optical receiver module, and configured to adjust a DC component of signal output, that is to say, to up or down shift the entire output signal.

The application of the logic controller is for example the first/second data selector, by which a digital signal is selected according to corresponding rules.

The serial interface is an interface for connection inside or external to the optical transceiver chip, which can increase the transmission speed.

The memory is configured to store data in the optical transmitter module and the optical receiver module.

The pseudo random data generator and checker are configured to detect the status of a module and check it, which enhance the stability and accuracy of the operation of each module circuit.

Figure 2:
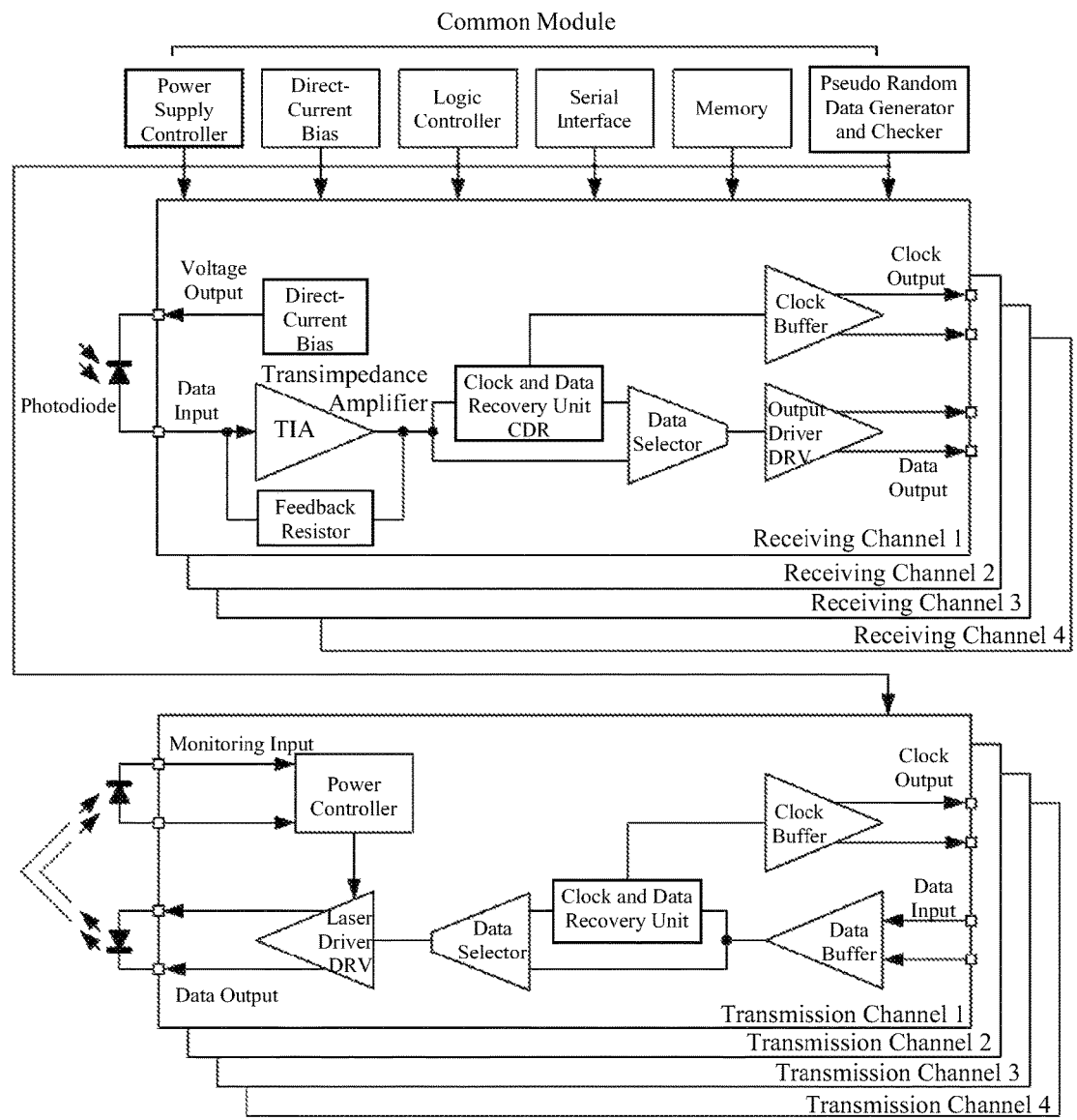
FIG. 2 is a logic diagram schematically showing a four-channel high-speed low-power-consumption optical transceiver chip according to the present invention.

FIG. 2 is a logic diagram schematically showing a four-channel high-speed low-power-consumption optical transceiver chip according to the present invention. The logical principle of the optical transmitter module and the optical receiver module are the same as those of the single-channel high-speed low-power-consumption optical transceiver chip as shown in FIG. 1. Each channel of the four-channel high-speed low-power-consumption optical transceiver chip as shown in FIG. 2 is disposed with an optical transmitter module, an optical receiver module, and a common module, such that data can be transmitted through multiple optical transmission channels and multiple optical receiving channels at the same time, thereby improving the data transmission efficiency.

The drawings are merely schematic and not drawn to scale. Although the present invention has been described with reference to preferred embodiments, it is to be understood that the protection scope of the present invention is not limited to the embodiments described herein.

Other embodiments of the present invention will be apparent and comprehensible to those skilled in the art from the description and practice of the present invention disclosed herein. The description and embodiments are merely exemplary, and the true scope and spirit of the present invention are as defined by the claims.

What is claimed is:

1. A single-channel high-speed low-power-consumption optical transceiver chip, comprising an optical transmitter module, an optical receiver module, and a common module, wherein the optical transmitter module comprises a data buffer, a first clock and data recovery unit, a first data selector, a laser driver, a power controller, a first clock buffer, a light-emitting diode, and a first photodiode, wherein the data buffer transmits input data via the first clock and data recovery unit to the first data selector;

the first clock buffer is connected to the first clock and data recovery unit and configured for clock output;

the input data is selected by the first data selector and then transmitted to the laser driver for data output, and the laser driver converts the input data into a voltage signal;

the voltage signal is converted into an optical signal by the light-emitting diode, and the optical signal is received, converted into another voltage signal, and transmitted to the power controller by the first photodiode monitoring an input end;

the power controller is connected to the laser driver, and configured to feed back and adjust the voltage signal outputted from the laser driver; and the optical transmitter module is arranged to have one channel;

the optical receiver module comprises a second photodiode, a direct-current bias module, a transimpedance amplifier, a feedback resistor, a second clock and data recovery unit, a second clock buffer, a second data selector, and an output driver, wherein the second photodiode converts a received optical signal into an electric signal and the direct-current bias module is configured to power the optical receiver module;

the transimpedance amplifier converts a current signal at a receiving end into a voltage signal and transmits the voltage signal to the second clock and data recovery unit;

the feedback resistor is connected in parallel with the transimpedance amplifier, and configured to adjust the electric signal in the transimpedance amplifier; and the second clock buffer is connected to the second clock and data recovery unit, and configured for clock output;

the second data selector inputs the voltage signal into the output driver;

the output driver converts the voltage signal into a digital signal and outputs the digital signal; and the optical receiver module is arranged to have one channel; and the common module comprises a power supply controller, a direct-current bias, a logic controller, a serial interface, a memory, and a pseudo random data generator and checker, wherein the common module also provides a communication loop for the optical transmitter module and the optical receiver module.

2. The optical transceiver chip according to claim 1, wherein the power controller comprises a direct current voltage conversion circuit and a 10-bit clock and data recovery circuit.

3. The optical transceiver chip according to claim 1, wherein the laser driver has a base current Ibase ranging from 0 to 80 mA; and a drive/modulation current Imod ranging from 0 to 80 mA.

4. The optical transceiver chip according to claim 1, wherein the data buffer has a maximum gain of 30 db and a maximum boost of 20 db.

5. The optical transceiver chip according to claim 1, wherein the first clock buffer has an interface of CML structure and 50Ω.

6. The optical transceiver chip according to claim 1, wherein the first clock and data recovery unit has a bandwidth ranging from 1 to 200 MHZ.

7. The optical transceiver chip according to claim 1, wherein the transimpedance amplifier has a gain ranging from 0 to 100 db.

8. The optical transceiver chip according to claim 1, wherein the second photodiode has a maximum input common-mode current of 10 mA.

9. The optical transceiver chip according to claim 1, wherein the second clock buffer has a differential output resistance of 100Ω.

10. A four-channel high-speed low-power-consumption optical transceiver chip, each channel comprising an optical transmitter module, an optical receiver module, and a common module, wherein the optical transmitter module comprises a data buffer, a first clock and data recovery unit, a first data selector, a laser driver, a power controller, a first clock buffer, a light-emitting diode, and a first photodiode, wherein the data buffer transmits input data via the first clock and data recovery unit to the first data selector;

the first clock buffer is connected to the first clock and data recovery unit and configured for clock output;

the input data is selected by the first data selector and then transmitted to the laser driver for data output, and the laser driver converts the input data into a voltage signal;

the voltage signal is converted into an optical signal by the light-emitting diode, and the optical signal is received, converted into another voltage signal, and transmitted to the power controller by the first photodiode monitoring an input end; and the power controller is connected to the laser driver, and configured to feed back and adjust the voltage signal outputted from the laser driver;

the optical receiver module comprises a second photodiode, a direct-current bias module, a transimpedance amplifier, a feedback resistor, a second clock and data recovery unit, a second clock buffer, a second data selector, and an output driver, wherein the second photodiode converts a received optical signal into an electric signal and the direct-current bias module is configured to power the optical receiver module;

the transimpedance amplifier converts a current signal at a receiving end into a voltage signal and transmits the voltage signal to the second clock and data recovery unit;

the feedback resistor is connected in parallel with the transimpedance amplifier, and configured to adjust the electric signal in the transimpedance amplifier; and the second clock buffer is connected to the second clock and data recovery unit, and configured for clock output;

the second data selector inputs the voltage signal into the output driver; and the output driver converts the voltage signal into a digital signal and outputs the digital signal; and the common module comprises a power supply controller, a direct-current bias, a logic controller, a serial interface, a memory, and a pseudo random data generator and checker, wherein the common module also provides a communication loop for the optical transmitter module and the optical receiver module.

11. The optical transceiver chip according to claim 10, wherein the power controller comprises a direct current voltage conversion circuit and a 10-bit clock and data recovery circuit.

12. The optical transceiver chip according to claim 10, wherein the laser driver has a base current Ibase ranging from 0 to 80 mA; and a drive/modulation current Imod ranging from 0 to 80 mA.

13. The optical transceiver chip according to claim 10, wherein the data buffer has a maximum gain of 30 db and a maximum boost of 20 db.

14. The optical transceiver chip according to claim 10, wherein the first clock buffer has an interface of CML structure and 50Ω.

15. The optical transceiver chip according to claim 10, wherein the first clock and data recovery unit has a bandwidth ranging from 1 to 200 MHZ.

16. The optical transceiver chip according to claim 10, wherein the transimpedance amplifier has a gain ranging from 0 to 100 db.

17. The optical transceiver chip according to claim 10, wherein the second photodiode has a maximum input common-mode current of 10 mA.

18. The optical transceiver chip according to claim 10, wherein the second clock buffer has a differential output resistance of 100Ω.

\* \* \* \* \*